(12) United States Patent
Jang et al.

(10) Patent No.: US 11,131,297 B2
(45) Date of Patent: Sep. 28, 2021

(54) MACHINE TOOL SYSTEM HAVING COMPACT AIR COMPRESSOR

(71) Applicant: NEW MOTECH CO., LTD., Gwangju (KR)

(72) Inventors: Jeong Cheol Jang, Gwangju (KR); Jong Hyuk Kim, Gwangju (KR); Jin Sun Park, Gwangju (KR); Han Seop Park, Suncheon-si (KR)

(73) Assignee: NEW MOTECH CO., LTD., Gwangju (KR)

( * ) Notice: Subject to any disclaimer, the term of this patent is extended or adjusted under 35 U.S.C. 154(b) by 0 days.

(21) Appl. No.: 16/640,051

(22) PCT Filed: Aug. 14, 2018

(86) PCT No.: PCT/KR2018/009339
§ 371 (c)(1),
(2) Date: Feb. 18, 2020

(87) PCT Pub. No.: WO2019/074200
PCT Pub. Date: Apr. 18, 2019

(65) Prior Publication Data
US 2021/0131414 A1    May 6, 2021

(30) Foreign Application Priority Data
Oct. 12, 2017  (KR) .......................... 10-2017-0132253

(51) Int. Cl.
*F04B 39/00*    (2006.01)
*F04B 23/02*    (2006.01)
(Continued)

(52) U.S. Cl.
CPC ........ *F04B 39/0044* (2013.01); *B23Q 11/005* (2013.01); *F04B 23/028* (2013.01);
(Continued)

(58) Field of Classification Search
CPC .... F04B 39/044; F04B 23/028; F04B 53/003; F04B 39/0044; F04B 35/04; F04B 41/02; F16F 15/04
See application file for complete search history.

(56) References Cited

U.S. PATENT DOCUMENTS 3,368,807 A * 2/1968 Thrasher ................. F16F 13/08
267/35
5,379,990 A * 1/1995 Ando ...................... F16F 9/103
267/34
(Continued)

FOREIGN PATENT DOCUMENTS

EP    3298278 B1 *  8/2018  ............ F04B 39/023
JP    09-032732 A    2/1997
(Continued)

OTHER PUBLICATIONS

International Search Report for PCT/KR2018/009339 dated Nov. 12, 2018 from Korean Intellectual Property Office.

*Primary Examiner* — Christopher S Bobish
(74) *Attorney, Agent, or Firm* — Revolution IP, PLLC

(57) ABSTRACT

A machine tool system including a compact air compressor configuring a compact air compressor C includes: an auxiliary air tank 40; and an air compressor body 30 connected with the auxiliary air tank 40, wherein the air compressor body 30 and the auxiliary air tank 40 are individually installed in a machine tool 20.

3 Claims, 4 Drawing Sheets

(51) Int. Cl.
    *F04B 35/04*     (2006.01)
    *F04B 41/02*     (2006.01)
    *F04B 53/00*     (2006.01)
    *F16F 15/02*     (2006.01)
    *B23Q 11/00*     (2006.01)

(52) U.S. Cl.
    CPC .............. *F04B 35/04* (2013.01); *F04B 41/02* (2013.01); *F04B 53/003* (2013.01); *F16F 15/022* (2013.01)

(56) References Cited

U.S. PATENT DOCUMENTS

| | | | | |
|---|---|---|---|---|
| 5,668,791 | A * | 9/1997 | Yamada | G11B 17/0405 360/99.18 |
| 8,327,985 | B2 * | 12/2012 | Boyd | F16F 15/023 188/379 |
| 8,714,947 | B2 * | 5/2014 | Asai | F04B 23/028 417/423.15 |
| 10,100,897 | B2 * | 10/2018 | Yasuda | F16F 15/022 |
| 10,106,979 | B2 * | 10/2018 | Lee | E04G 23/0218 |
| 2005/0106042 | A1 * | 5/2005 | Lee | F04B 39/0044 417/313 |
| 2007/0034770 | A1 * | 2/2007 | Chiu | F16F 13/007 248/616 |
| 2010/0290929 | A1 | 11/2010 | Ohi et al. | |
| 2011/0290354 | A1 * | 12/2011 | Wood | F04B 39/0061 137/565.17 |
| 2014/0115868 | A1 * | 5/2014 | Ruhlander | F16B 5/0241 29/525.02 |
| 2015/0207380 | A1 * | 7/2015 | Taketomi | F16M 1/04 310/91 |
| 2019/0242393 | A1 * | 8/2019 | Stetina | F04D 29/321 |

FOREIGN PATENT DOCUMENTS

| | | | |
|---|---|---|---|
| JP | 11-230039 A | 8/1999 | |
| JP | 2002-257190 A | 9/2002 | |
| JP | 2003-025168 A | 1/2003 | |
| KR | 10-0597864 B1 | 7/2006 | |
| WO | WO-2008047168 A1 * | 4/2008 | .............. F04B 37/14 |

* cited by examiner

[Fig. 1]
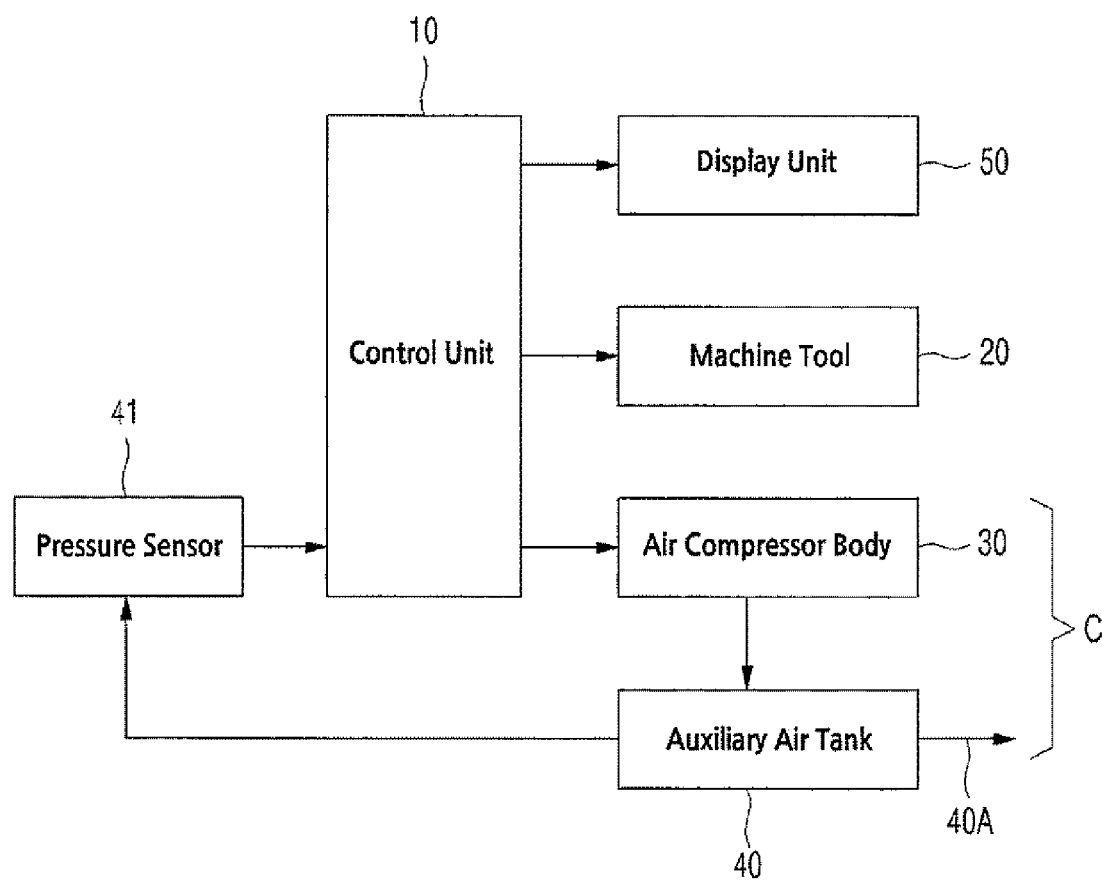

[Fig. 2]
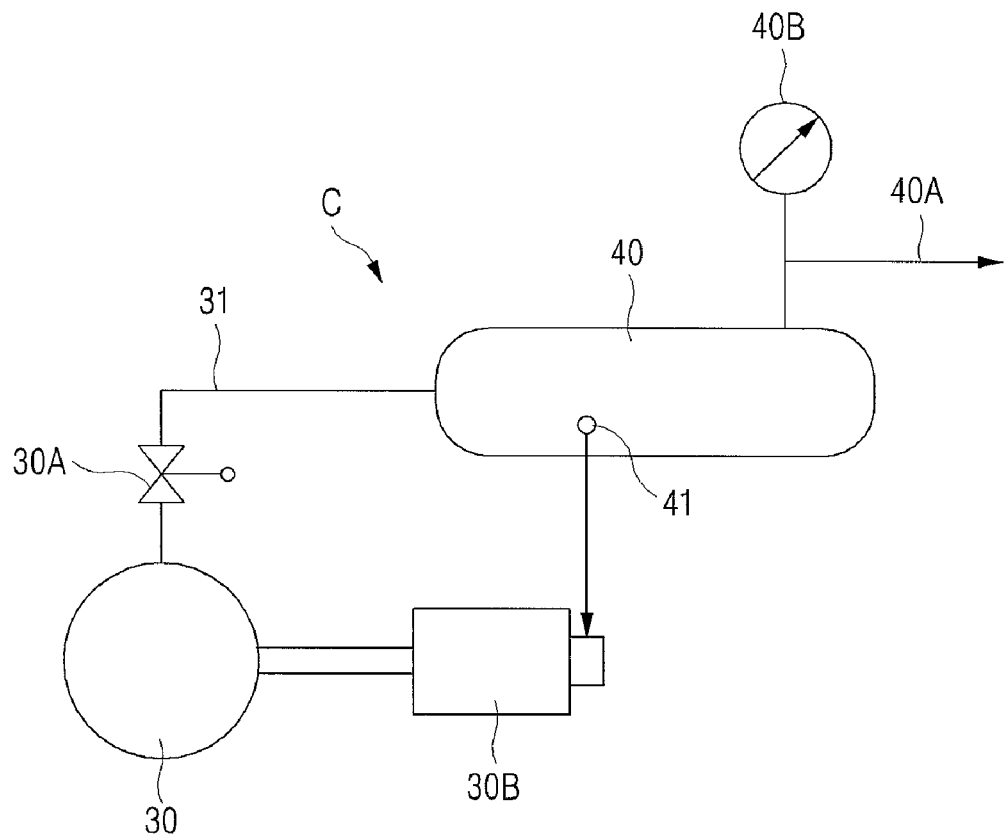
[Fig. 3]
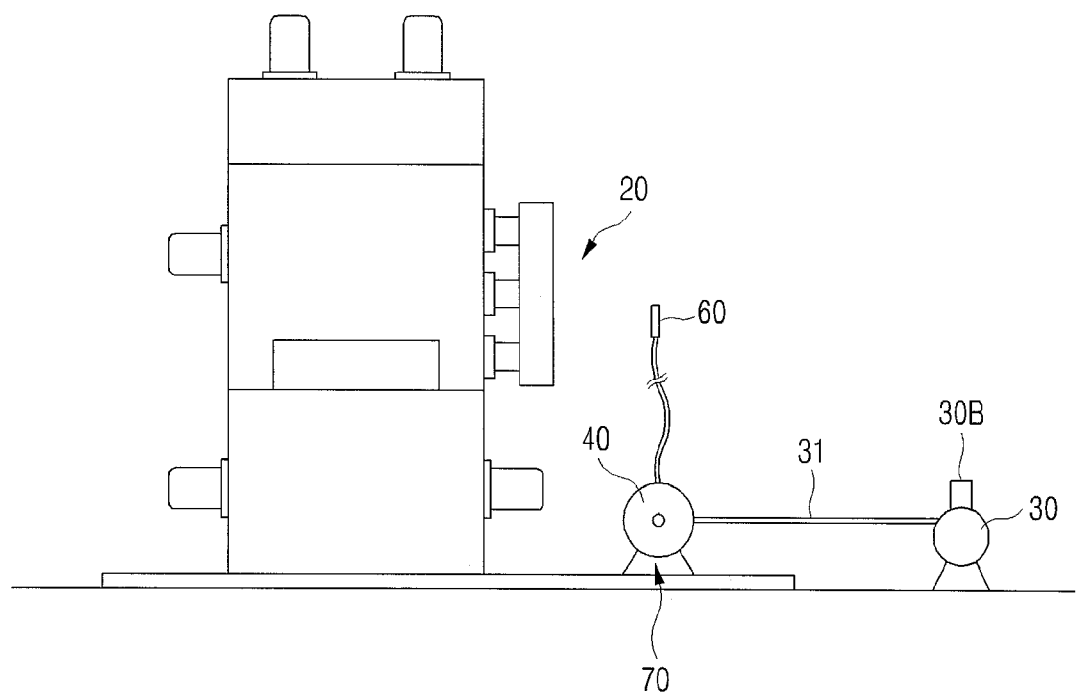

[Fig. 4]
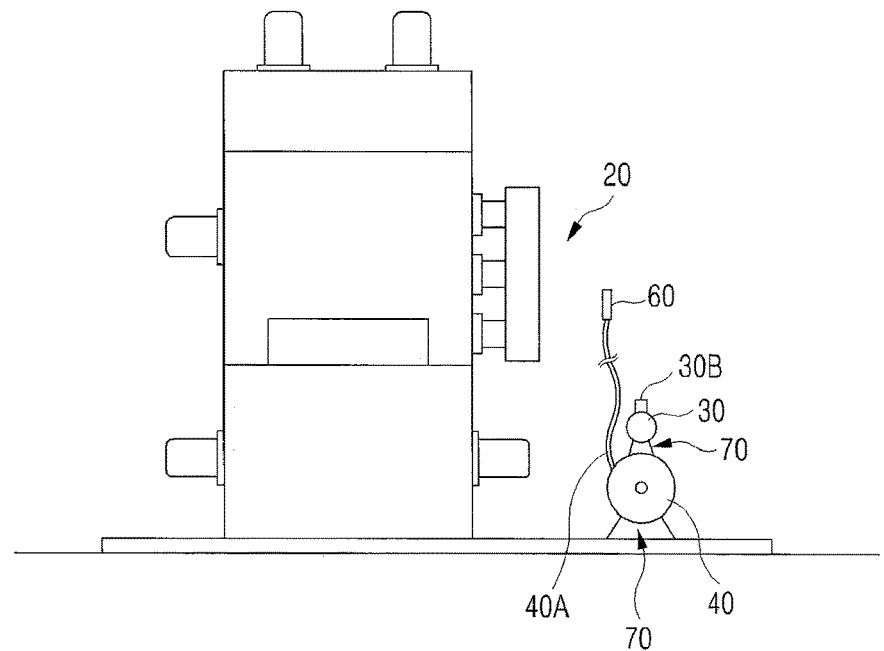
[Fig. 5]
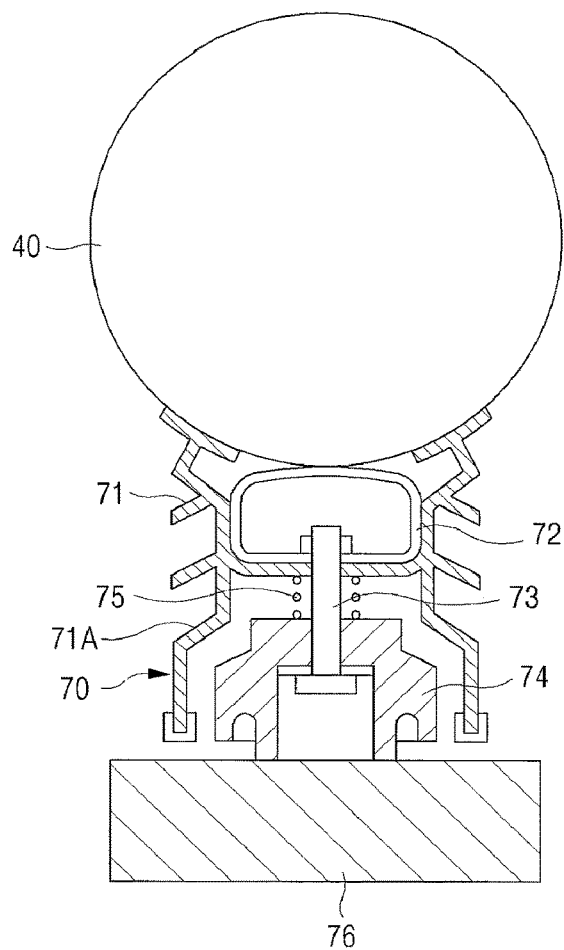

[Fig. 6]
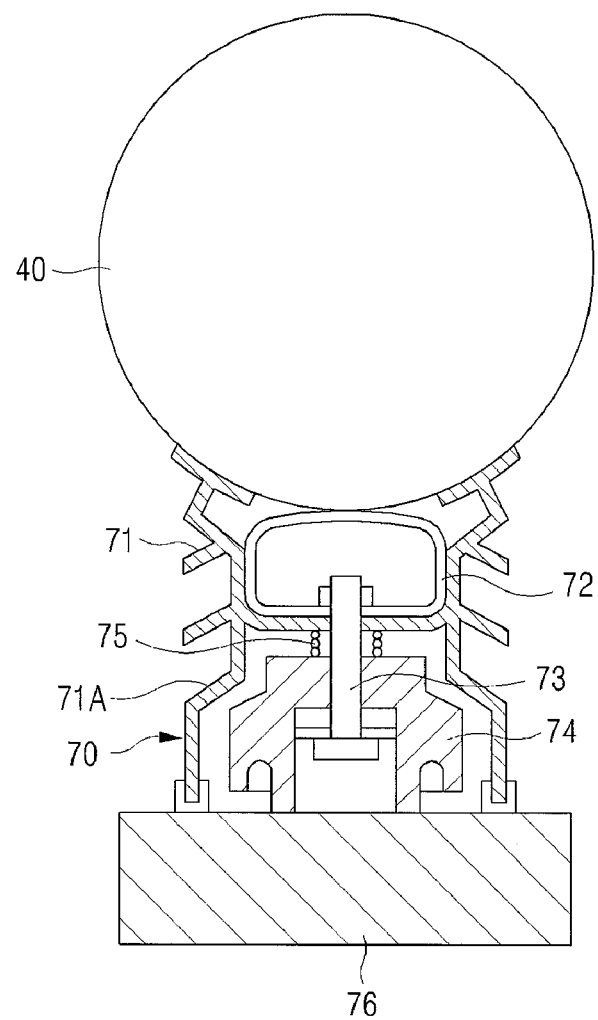

MACHINE TOOL SYSTEM HAVING COMPACT AIR COMPRESSOR

TECHNICAL FIELD

The present invention relates to a compact air compressor which can be individually installed in a machine tool such as a milling machine, a drill, a lathe, etc. More specifically, the present invention provides a compact air compressor which is individually disposed for each machine tool to supply compressed air required, thereby reducing power waste, reducing installation costs and also allowing easy maintenance, and a machine tool system having the same.

BACKGROUND ART

In general, machine tools such as milling machines, drills, lathes, etc., need compressed air produced by compressing air in order to remove scraps left after processing or washing the machine tools, or use air compressors in order to supply air pressure to the machine tools.

As an example of the machine tool applying the air compressor, there is a system which is provided with a plurality of air compressor bodies and a single compressed air tank, and supplies compressed air to a plurality of machine tools, as in prior art, Korean Patent No. 10-0597864.

Such machine tool system supplies compressed air produced by a plurality of air compressor bodies or by a large-capacity air compressor body to equipments requiring the compressed air through respective pipes connected to a single compressed air tank. As such, a single compressed air tank stores compressed air and supplies the compressed air as much as needed for each of a plurality of equipments, even though the equipments use different amounts of air.

Such compressor system connects machine tools to a single compressed air tank connected with a plurality of compressor bodies, through a plurality of pipes, which incurs high initial installation costs because of piping works, etc. Also, the system is to install a plurality of valves for each pipe so as to reduce leakage, which involves excessive installation costs and power waste. In the case of using a large-capacity air compressor for equipments using relatively less amount of compressed air, significant power waste is caused by operation of the large-capacity air compressor. When an air compressor malfunctions or needs to be checked, all of the plurality of machine tools must stop operation, leading to degraded productivity caused by the machine tools.

DISCLOSURE OF INVENTION

Technical Problem

It is an object of the present invention to have a compact air compressor disposed in each machine tool, thereby shortening the length of the pipe connecting the air compressor with the machine tool and also eliminating unnecessary installment of valves, which allows easy maintenance of the air compressor system and reduction of installment costs.

Also, it is an object of the present invention to supply compressed air to each machine tool requiring the compressed air, thereby reducing power waste.

Also, it is an object of the present invention to stop only the air compressor which needs to be checked or malfunctions and allow the other air compressors which supply compressed air to the rest of equipments to operate, thereby ensuring machine tool operation without interruption and increasing productivity.

Solution to Problem

A machine tool system having a compact air compressor according to the present invention configures a compact air compressors C including an auxiliary air tank 40 and an air compressor body 30 connected with the auxiliary air tank 40, wherein the air compressor body 30 and the auxiliary air tank 40 are individually installed in a machine tool 20.

According to the present invention, it is preferable that a BLDC motor 30B is mounted on the air compressor body 30 to increase the RPM of the motor.

According to the present invention, the air compressor body 30 and the auxiliary air tank 40 are coupled and installed in the machine tool 20, and a vibration attenuating device 70 may be installed beneath the auxiliary air tank 40.

According to the present invention, the vibration attenuating device 70 may be installed beneath the air compressor body 30.

According to the present invention, it is preferable that the vibration attenuating device 70 is configured to include an elastic member 71 contacting the lower portion of the auxiliary air tank 40; a hollow member 72 installed inside the elastic member 71; a fixed shaft 73 inserted into the hollow member 72 with a washer; a support member 74 coupled to the lower portion of the fixed shaft; and a spring 75 installed in the fixed shaft 73 between the bottom center of the elastic member 71 and the support member 74.

Advantageous Effects of Invention

The present invention has the effect of providing a machine tool system having a compact air compressor, which is individually disposed for each machine tool to supply compressed air required, thereby reducing power waste, reducing installation costs and also allowing easy maintenance.

BRIEF DESCRIPTION OF DRAWINGS

FIG. 1 is a block diagram of an air compressor and a machine tool system illustrating an embodiment of the present invention;

FIG. 2 is a schematic diagram of piping of the compact air compressor according to the first embodiment of the present invention;

FIG. 3 is a view illustrating a state in which the compact air compressor according to the first embodiment of the present invention is installed in the machine tool;

FIG. 4 is a view illustrating a state in which the compact air compressor according to the second embodiment of the present invention is installed in the machine tool;

FIG. 5 is a cross-sectional view illustrating the installment of a vibration attenuating device applied to the compact air compressor of the present invention; and FIG. 6 is a cross-sectional view illustrating the operation of the vibration attenuating device illustrated in FIG. 5.

MODE FOR THE INVENTION

The present invention relates to a machine tool system having a compact air compressor which can be individually installed in a machine tool. The present invention will be described in detail with reference to the accompanying drawings as follows.

FIG. 1 is a block diagram of a compact air compressor and a machine tool system using the same, illustrating an embodiment of the present invention. The machine tool system may include a machine tool 20 operated by a control unit 10; an air compressor body 30 driven by the control unit 10; an auxiliary air tank 40 connected to the air compressor body 30 with a pipe 31; and a display unit 50.

In FIG. 1, reference numeral 41 denotes a pressor sensor 41. The compact air compressor C may include an auxiliary air tank 40 connected to the air compressor body 30 with the pipe 31; and a pressure sensor 41. The machine tool 20 described above may refer to various machine tools such as a milling machine, a drill, a lathe, etc., and a combination thereof, etc.

FIG. 2 is a schematic diagram of piping of the compact air compressor C according to the first embodiment of the present invention. An opening/closing valve 30A is installed in the pipe 31 connecting the air compressor body 30 with the auxiliary air tank 40, a motor 30B for driving the air compressor body 30 is configured to receive a signal sensed by the pressor sensor 41 installed in the auxiliary air tank 40, and a pressor gauge 40B may be installed in a compressed air outlet 40A installed in the auxiliary air tank 40.

The motor 30B applies a BLDC motor with one horsepower or less to increase the RPM to 4,000 or greater, thereby enhancing the power of releasing compressed air of the compact air compressor C. The motor allows the compressed air required to be supplied to the machine tool 20 without a large-capacity air compressor.

In the compressed air outlet 40A installed in the auxiliary air tank 40, an air gun 60 or a socket may be installed to connect an air hose connected to the machine tool 20 and supply compressed air to the machine tool 20 for use.

FIG. 3 is a view illustrating a state in which the compact air compressor according to the first embodiment of the present invention is installed in the machine tool. FIG. 3 illustrates a system in which the auxiliary air tank 40 is disposed on the bottom surface of the machine tool 20 on one side, and then the air compressor body 30 is connected to the auxiliary air tank 40 with the pipe 31.

According to the first embodiment of the present invention, the system in which an individual air compressor body 30 is connected to the auxiliary air tank 40 disposed in each machine tool 20 allows the compact air compressor C to supply the required compressed air to the machine tool 20. Thereby, the present invention can shorten the length of the pipe connecting the compact air compressor body 30 with the machine tool 20 and also eliminate unnecessary pipes, leading to reduction of installment costs. The present invention can also supply compressed air to the respective machine tools requiring the compressed air, thereby reducing power waste. Also, the present invention can stop only the air compressor which needs to be checked or malfunctions and allow the other air compressors which supply compressed air to the rest of equipments to operate, thereby enabling easy maintenance and increasing productivity by continuous machine tool operation.

Particularly, although the present invention uses the compact air compressor C, it increases the RPM to 4,000 or greater by applying the BLDC motor 30B with one horsepower or less to the air compressor body 30, thereby enhancing the power of releasing the compressed air of the compact air compressor C and enabling great reduction of power waste caused by the use of a large-capacity air compressor.

FIG. 4 is a view illustrating a state in which the compact air compressor according to the second embodiment of the present invention is installed in the machine tool. FIG. 4 illustrates a system in which the air compressor body 30 and the auxiliary air tank 40 are coupled to each other, and disposed in the machine tool 20.

Here, the compact air compressor C in which the air compressor body 30 and the auxiliary air tank 40 are coupled has an advantage that the pipe 31 connecting the air compressor body 30 with the auxiliary air tank 40 can have a very short length. However, self-vibration of the compact air compressor C occurring upon operation may affect the machine tool 20, which causes degraded productivity of the machine tool 20 and noise generated from vibration.

In order to solve such issue, the present invention may install the vibration attenuating device 70 beneath the auxiliary air tank 40, as illustrated in FIG. 5, or beneath the air compressor body 30, to attenuate vibration generated from the compact air compressor C.

As illustrated in FIG. 5, the vibration attenuating device 70 includes an elastic member 71 contacting the lower portion of the auxiliary air tank 40; a hollow member 72 installed inside the elastic member 71; a fixed shaft 73 inserted into the hollow member 72 with the washer; a support member 74 coupled to the lower portion of the fixed shaft; and a spring 75 installed in the fixed shaft 73 between the bottom center of the elastic member 71 and the support member 74. A support 76 may be installed beneath the support member 74. The vibration attenuating device 70 may be installed beneath the air compressor body 30.

When the compact air compressor C operates and causes up and down vibration, the auxiliary air tank 40 or the air compressor body 30 presses the elastic member 71 and the hollow member 72 or goes back to its original position while vibrating up and down, as illustrated in FIG. 6, and thereby the vibration attenuating device 70 attenuates the vibration. When the elastic member 71 and the hollow member 72 are pressed, the elastic member 71 compresses the spring 75 and absorbs the generated vibration by contact of a leg part 71A of the elastic member 71 with the support 76. Thus, the vibration generated from the compact air compressor C does not affect the machine tool 20 and noise can be prevented.

Meanwhile, according to the present invention, the elastic member 71, the hollow member 72 and the support member 74 may be made of a rubber material or a synthetic resin material having cushion properties.

The detailed description of the present invention described as above simply explains examples for understanding the present invention, but does not intend to limit the scope of the present invention. The scope of the present invention is defined by the accompanying claims. Additionally, it should be construed that equivalent modifications or changes fall within the scope of the present invention.

The invention claimed is:

1. A compact air compressor installed with a machine tool system, comprising:
   an auxiliary air tank (40); and
   an air compressor body (30) connected with the auxiliary air tank (40); and
   a vibration attenuating device (70) installed a lower portion of the auxiliary air tank (40),
   wherein the vibration attenuating device (70) comprise:
   an elastic member (71) contacting the lower portion of the auxiliary air tank (40);
   a hollow member (72) installed inside the elastic member (71);
   a fixed shaft (73) inserted into the hollow member (72) with a washer;
   a support member (74) coupled to a lower portion of the fixed shaft (73);

a spring (75) installed on the fixed shaft (73) between a bottom center of the elastic member (71) and the support member (74); and a leg part (71A) connected from the elastic member (71), wherein upon the elastic member (71) and the hollow member (72) being pressed, the elastic member (71) is configured to compress the spring (75) and is configured absorb a generated vibration by contacting the leg part (71A) of the elastic member (71) with the support (76).

2. The compact air compressor of claim 1, wherein a BLDC motor (30B) is mounted on the air compressor body (30).

3. The compact air compressor of claim 1, wherein the vibration attenuating device (70) is installed beneath the air compressor body (30).

\* \* \* \* \*